E. FAULL.
LUBRICATOR.
No. 174,508.
Patented March 7, 1876.
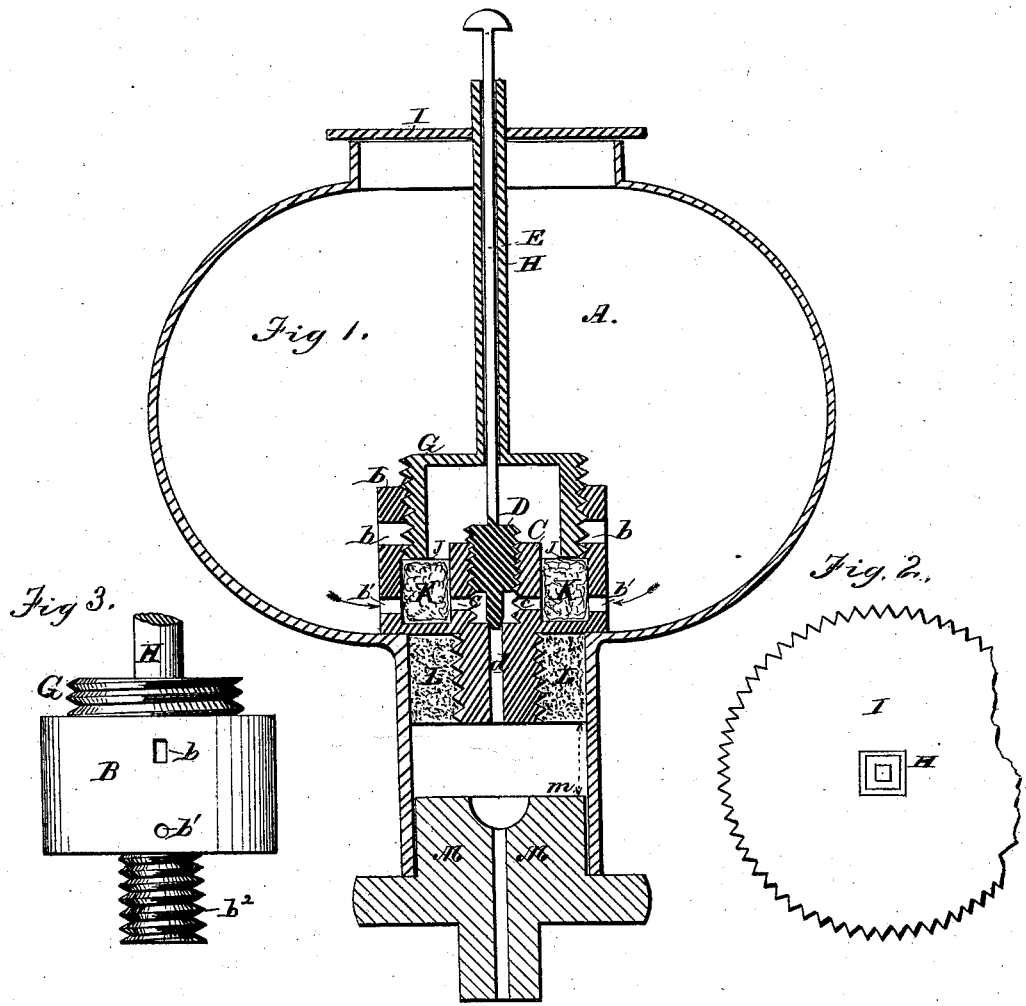

UNITED STATES PATENT OFFICE.

EDWIN FAULL, OF MELBOURNE, COLONY OF VICTORIA.

IMPROVEMENT IN LUBRICATORS.

Specification forming part of Letters Patent No. 174,508, dated March 7, 1876; application filed February 17, 1873.

*To all whom it may concern:*

Be it known that I, EDWIN FAULL, of Melbourne, in the county of Bourke and Colony of Victoria, machinist, have invented certain Improvements in Lubricators for Line-Shafting, Piston-Guides, and other Analogous Purposes, of which the following is a specification:

This invention consists, mainly, first, in the combination of an internal cylinder, having inlet and outlet passages, with a filtering substance, and an adjustable screw-cap for compressing this substance; second, in the combination, with the elements of the first clause, of a shut-off valve, all of which will be fully described hereinafter.

In the drawings, Figure 1 represents a central vertical sectional elevation of my improved lubricator; Fig. 2, a plan view of the cover I, and Fig. 3, a separate view of the internal cylinder for regulating the supply of oil.

A represents the reservoir proper. B represents the internal regulating-cylinder, provided with the orifices $b$ $b^1$ and the screw-thread extension $b^2$, having the central orifice $d$, and the central internally threaded projection C, having the lateral openings $c$ $c$, as shown. G represents a screw-cap, adapted to close the upper part of the chamber B, and provided with a square tube, H, as shown. D represents a screw-valve, which is operated by means of the stem E, as shown, to open or close the central orifice $d$ in the extension $b^2$, as shown in Fig. 1. K represents sponge or similar material interposed between the openings $c$ and $b^1$, as shown in Fig. 1. L represents a cork collar, by means of which the glass and metal parts are united with a tight joint. M represents an attachment, preferably of wood, by means of which the lubricator is adapted to be attached to the shafting.

The operation is as follows: The oil in the vessel A, when the lubricator is in operation, passes into the opening $b^1$, through the sponge K and openings $c$ into the passage $d$, the plug D being raised for that purpose, and from thence to the shafting.

The sponge or other filling material may be more or less compressed by adjusting the cap G, as may be desired. By raising it sufficiently high, also, the oil may be permitted to flow in through the openings $b$.

The sponge serves to filter the oil and retain all sand and grit which may be contained therein. At night, or when the machinery is at rest, the flow of oil may be cut off by screwing down the plug D.

Having thus fully described my invention, what I claim as new, and desire to secure by Letters Patent, is—

1. The combination of the cylinder B, having passages $b$ $b^1$ $d$, with the filtering substance K and the adjusting-cap G, as described.

2. The combination of the cylinder B, having openings $b$ $b^1$ $d$, and threaded extensions $b^2$, with a cap, G, and valve D, as described.

EDWIN FAULL.

Witnesses:
 EDWARD WATERS,
 WALTER SMYTHE BAYSTON.